March 23, 1965     T. KILBURN     3,175,199
INFORMATION STORAGE APPARATUS
Filed Oct. 27, 1958     5 Sheets-Sheet 1
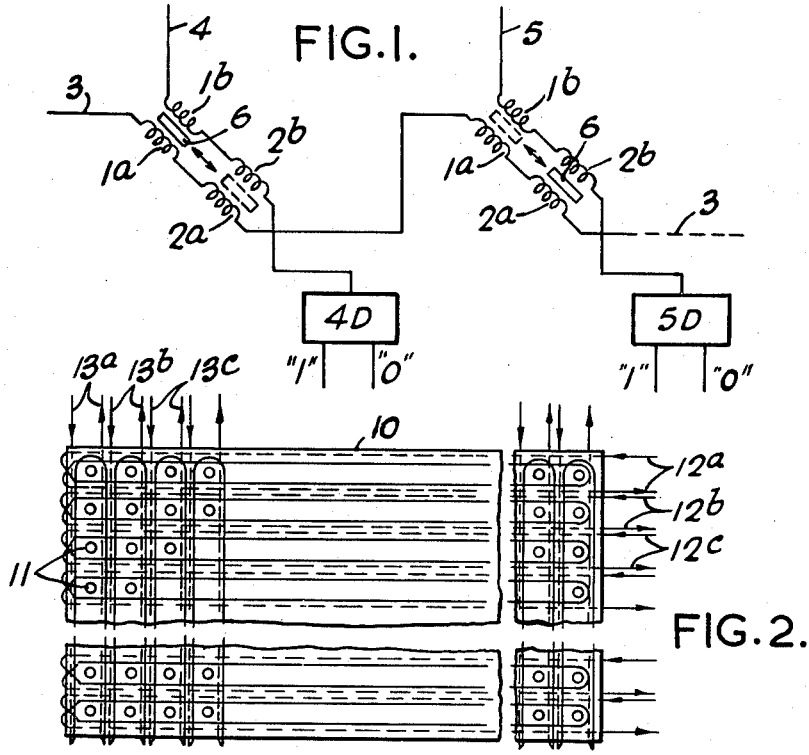
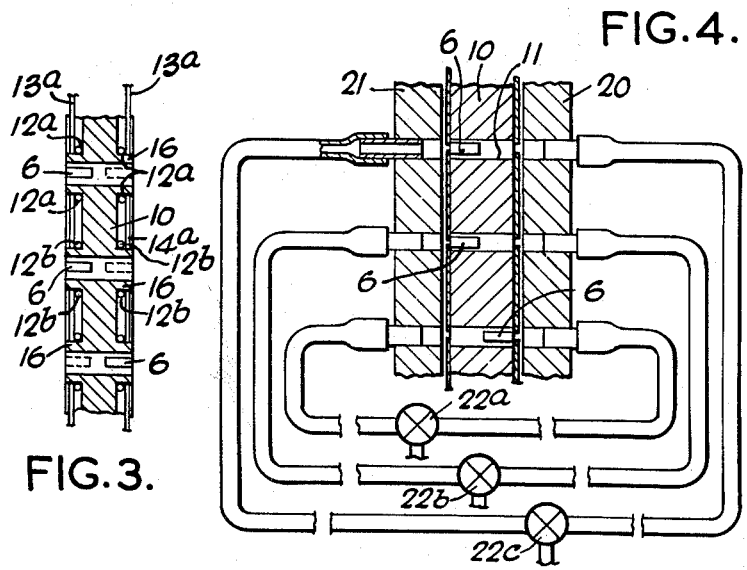
Inventor: Tom Kilburn
By Stevens, Davis, Miller & Mosher
Attorneys March 23, 1965 T. KILBURN 3,175,199
INFORMATION STORAGE APPARATUS
Filed Oct. 27, 1958 5 Sheets-Sheet 2

Inventor:
Tom Kilburn
By: Stevens, Davis, Miller & Mosher
Attorneys

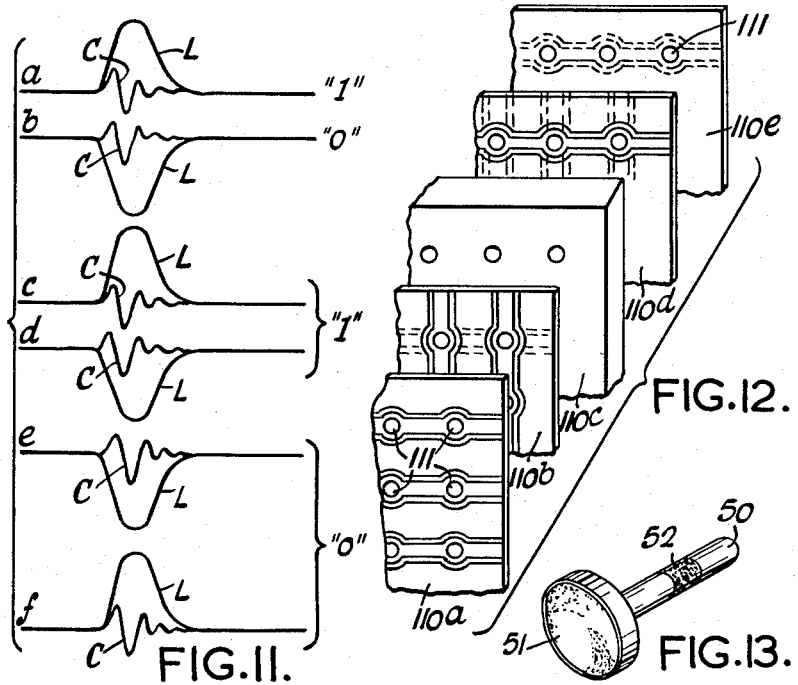

United States Patent Office 3,175,199
Patented Mar. 23, 1965

3,175,199
INFORMATION STORAGE APPARATUS
Tom Kilburn, Davyhulme, Manchester, England, assignor, by mesne assignments, to International Business Machines Corporation, New York, N.Y., a corporation of New York
Filed Oct. 27, 1958, Ser. No. 769,774
Claims priority, application Great Britain, Oct. 30, 1957, 33,942/57; Dec. 13, 1957, 38,825; Aug. 7, 1958, 25,354
19 Claims. (Cl. 340—174)

This invention relates to information storage.

One of the earliest information stores was the abacus, in which beads could be moved on wires so as to store number values.

Nowadays the storage of information has become a very important part of electronic computers and data processing equipment generally and many types of store have been proposed.

It is usual for computers and other data processing equipment to operate in binary notation, since the very fast electronic devices are two-state.

One of the most attractive approaches to binary storage has been the ferromagnetic toroid made of magnetic material having a square hysteresis loop which will remain in either of two saturated states.

However, such stores suffer from the drawback that in their simple form they have to be read by changing their magnetic state, so that the read-out destroys the record and the information is lost.

In the operation of such stores, there is a limitation of speed in that the actual speed with which the magnetisation of the core can be set into one state or the other is limited by the magnitude of the current pulse which can be applied to it, particularly if the arrangement is such that undue influence on other cores in the surrounding matrix is to be avoided. Additionally, and more important, the need to rewrite information back into the store involves delay in the operation of the machine since the circuits by which the cores to be operated on are selected cannot be used for further selection until the rewriting operation is completed. A virtue is sometimes made of this necessity to the extent that the information returning back into the store is modified so that when next demanded it will have the proper significance which it is required to have at this later stage of the computation, but the facility for doing this is one which it is frequently possible to dispense with.

Nevertheless, the toroids can be built up into two-dimensional and three-dimensional coordinate arrays, which are static and will retain their condition without stimulus indefinitely, and direct access can be obtained to information in any part of an array or matrix, so that despite the above drawbacks they are coming into increasing use.

However, for certain purposes, very fast "writing" is not essential. Thus, certain instructions in computers are of a semi-permanent nature and certainly do not require modification or replacement during computing operations; any modification or replacement is done when the computer is not in use and when therefore extreme speed is not essential.

A typical cycle of operations of a digital computer involves two withdrawals of information from the store. First an instruction which contains inter alia the addresses of data to be operated on is withdrawn and then the data identified by the instruction is extracted from the store. Each of these operations will, in the normal way, have to be followed by the rewriting operation above referred to. If, therefore, the need to rewrite the information could be avoided, a good deal of time could be saved. In fact, it so happens that instruction words, one of which is used for each cycle of operations, are repeatedly used without change. If, therefore, the rewriting time can be eliminated only for instruction words, something like half the time can be saved on each cycle.

For other purposes in the data-processing field, permanent or long-term stored information is required, which, once correctly set up, is liable to change only at intervals of the order of weeks or months.

The object of present invention is to produce a type of store capable of very fast, non-destructive and repeatable read-out, in which high speed of "writing" is a secondary consideration.

One aspect of the invention consists in an information storage device which is arranged to be mechanically set, or not set, to a particular one of a plurality of predetermined electrical conditions, respectively by the insertion in or removal from, a predetermined position in the device, of a member capable of modifying the electrical condition of the device, and which is capable of non-destructive repeatable electrical read-out.

It will be seen that the technique developed depends on the presence or absence of a member within the storage cell so as to modify the electrical characteristics of the cell.

Thus the storage itself is of a mechanical nature, and once a setting or storage has been made, it will persist until the characteristic-modifying member is again moved. The reading is electrical and does not in any way affect the setting of the store, which can be read an indefinite number of times for one setting.

The technique is very suitable for binary notation but can also be applied to other notations.

In the embodiments to be described, the electrical characteristic which is modified is mutual induction between conductors, but the invention can also be applied to the modification of capacity, although the theoretical ratios obtainable by presence or absence of a ferrite core with induction coils are far greater than those obtainable as between air and a material of high dielectric constant in a capacitor.

Mutual induction can be increased by a core of high permeability with respect to air, or can be decreased by a core of low permeability with respect to air, such as copper.

In the use of variable induction, the difference between the voltages generated in a secondary winding when the core is present, and absent, respectively, can be used to differentiate between, for instance, "I" and "O." Alternatively two pairs of inductively-coupled windings having oppositely-wound secondaries can be used, so that the output voltages are of opposite polarity in response to the same current input: the output of one or other polarity will predominate according as a single core is positioned adjacent the one or adjacent the other pair of windings.

It will be understood that the induction coil windings used may be single lengths of wires or elementary loops, or a plurality of turns.

While individual storage devices of the binary or other type could, if required, be used singly, or in a single row or column, the main practical use of the devices is for building up coordinate arrays or matrices of devices in computers, and other data-processing equipment. Such matrices will usually have, along one main dimension, a number of devices equal to, or a multiple of, the number of digits in a "word," the other dimension being determined by the number of words to be stored.

The removable member used for modifying the characteristics of a device may be of any desired shape. For induction coils, the preferred form is a small cylindrical magnetic slug, of the order of diameter of the lead of a lead pencil, but such slugs could be of rectangular or other cross-section, or a ball. A toroid is a possibility, but would involve difficulties except where a completely permanent record was required: nevertheless, the use of a toroid is within the scope of the invention.

Preferably, the magnetic members used will be as free from hysteresis as practicable, although even square-loop materials can be used if desired.

By the use of the type of access equipment well known for ferrite stores, immediate access can be obtained to any individual storage device, or any row or column of storage devices for reading out the contents.

Movements of the magnetic slugs or cores between two positions in relation to the conductor mesh which represent the two kinds of information "0" and "1" of a binary system of notation may be brought about in a variety of ways. In a preferred arrangement the cores are located in bores through a supporting body with the two surfaces of which the mesh is associated and the cores may be moved from one end of the bore to the other by air jets selectively applied to the appropriate ends of the bores. A mechanism for applying air jets to the cores may be progressed over the surface of the supporting body so as to set up in turn the information to be stored in the various parts of the mesh.

The invention will be clearly understood from the following description given with reference to the accompanying drawings in which:

FIG. 1 is a fragmentary circuit diagram illustrating one form of operation of the invention, using two differentially-connected pairs of coils per storage device or element, FIG. 2 is a view of part of a matrix store incorporating a number of storage elements of the type shown in FIG. 1, FIG. 3 is a partial section of a store according to FIG. 2, FIG. 4 is a view, partly in section, of a store of the kind shown in FIGS. 2 and 3 in combination with means for setting up information therein, FIGS. 5, 6, 7 and 8 are fragmentary sectional views of alternative forms of store elements forming part of matrix stores, FIG. 9 is an exploded view of a fragment of an alternative form of store, FIG. 10 represents partly diagrammatically a portion of another storage apparatus together with some of the electrical circuitry associated therewith, FIG. 11 is a series of waveform diagrams illustrating the operation of FIG. 10.

FIG. 12 illustrates a fragment of a storage apparatus constructed by a different method, and FIGURE 13 illustrates another form of slug device.

FIG. 14 is a schematic diagram of store setting equipment utilising pneumatic power, while

Figure 5:
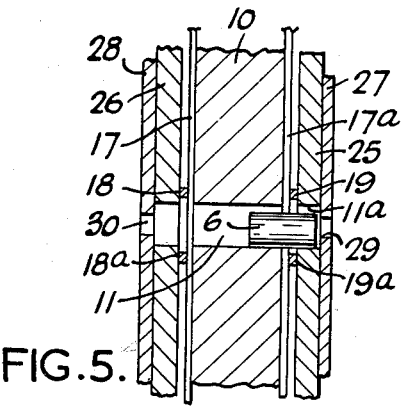

Referring first to FIG. 1, this shows two elements or storage devices of a coordinate or matrix store. Each device comprises two pairs of coils $1a$, $1b$, and $2a$, $2b$. The coils $1a$, $2b$ are connected in series in a circuit indicated by the wire 3 which follows a horizontal coordinate of a circuit matrix. Each pair of coils $1b$, $2b$ is connected in series with one another in the respective vertical coordinates 4 and 5 of the matrix. Coils $1a$ and $1b$ are physically located so as to be inductively coupled together and coils $2a$ and $2b$ are similarly coupled, but the connections are so made that the coupling between $1a$ and $1b$ is electrically in the reverse sense to that between $2a$ and $2b$. It follows that a pulse signal applied down the line 3 will induce signals in coils $1b$ and $2b$ which will oppose one another and there will tend to be no signal propagated in the corresponding circuit 4 or 5. However, associated with each store element is a magnetic core 6 which is physically moveable so as to influence the coupling either between $1a$ and $1b$ or that between $2a$ and $2b$.

The effect of this is that the coupling between the pair of coils with which the core 6 is associated will be enhanced, and the signal induced in coil $1b$ will override the signal in coil $2b$ or vice versa according to the location of core 6. In the left hand element the core is shown associated with coils $1a$ and $1b$ and in the right hand element the core is shown associated with coils $2a$ and $2b$. As a result of this distribution of the cores, and of the inversion between the connections of coils $1b$ and $2b$, the sense of the signal induced in wire 4 by a given signal in wire 3 will be the reverse of that induced in wire 5 by that signal. Supposing the signal applied to wire 3 is in the form of a current pulse, then the voltage signals induced in the wires 4 and 5 will have positive-going and negative-going portions and if the signal in wire 4 is in the form of a positive-going portion followed by a negative-going portion, then that induced in wire 5 will consist of a negative-going portion followed by a positive-going portion. Discriminating circuits 4D, 5D of any well-known construction discriminate between these two signals and give a signal on the "1" or on the "0" output channel accordingly.

It will be appreciated however that a ring pair of windings, e.g. $1a$, $1b$ can constitute a storage device, the differentiation between "1" and "0" being obtained by the relative magnitudes of the outputs obtained from the secondary $1b$ when the slug or core is present or absent from the coupling position.

Figure 10:
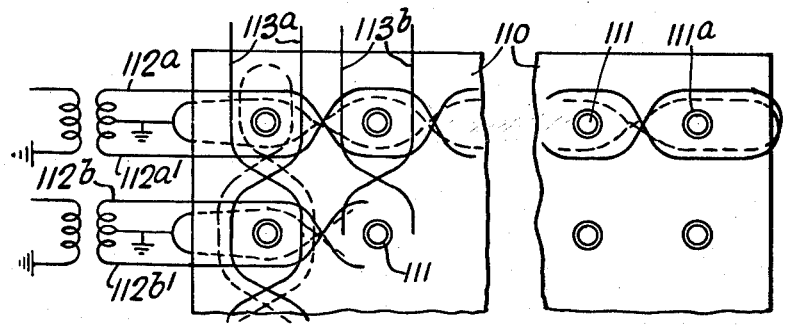

The physical realization of an arrangement according to FIG. 1 can take a variety of different forms, but in the arrangement to be described the coils $1a$ and $1b$ are conveniently mounted on one face of a plate of insulating material while the coils $2a$ and $2b$ are mounted on the opposite face. The core 6 may then lie in a bore passing through the insulating material so that it may be moved through the thickness of the plate so as to lie within the coils on either the one or the other surface of the plate. Such an arrangement is shown in FIGS. 2 and 3. In these figures 10 is a sheet of insulating material through which pass a large number of bores 11 forming a rectangular matrix. Each bore contains a small slug of magnetic material 6. It is convenient to arrange for a vertical column of store elements to serve for the storage of the digits of at least one whole word so that the digits forming at least one word of information can be read out simultaneously on horizontal wires from a vertical column in response to an interrogation applied to the whole column. With this in mind, windings are provided for each horizontal row to perform the functions of coils $1b$ and $2b$. These are shown in FIG. 2 at $12a$, $12b$, $12c$ etc. To trace one of these windings, say $12a$, starting at the right hand edge of the plate it passes along the top of the topmost horizontal row of holes along the rear face of the plate 10 round the left hand edge of the plate, on to the front face of the plate along the bottom of the topmost horizontal row of holes back to the right hand edge. At the right hand edge of the plate it bends back upon itself in a hairpin loop and passes back, still on the front face of the plate, along the upper side of the row of holes to the left hand edge of the plate where it passes round the edge of the plate to the rear surface of the plate adjacent the lower side of the row of holes and so back to the right hand edge. It will be seen that the loops on both ends of any hole are both anti-clockwise.

Windings performing the function of coils $1a$ and $2a$ are on the vertical columns. These windings are shown in FIG. 2 at $13a$, $13b$, $13c$ etc. To trace one of these wires, say $13a$, starting at the top edge of the plate 10 it passes down behind the plate to the left of the first vertical column of holes round under the bottom edge of the plate and up to the top of the plate on the front face of the plate still lying on the left hand side of the holes. At the top of the column it bends back upon itself in a hairpin loop which passes round the topmost hole, passes down on the right hand side of the vertical column still on the front surface, under the bottom edge of the plate and back up to the top edge of the plate, still on the right hand side of the holes but on the rear surface of the plate. It will be seen that the loops on the rear end of all holes are anti-clockwise and those on the front ends all clockwise.

It will be seen that the wires 13 are the interrogating windings and the wires 12 are the "read" windings: in this case the interrogating windings per hole are differentially wound, and the "read" windings per hole are similarly wound but the effect is the same as the converse shown in FIG. 1.

The arrangement is shown in cross-section in FIG. 3, which shows how each hole 11 is surrounded by a rim or boss 16 which serves to locate the wires 12, 13 in relation to the holes. The arrangement of wires shown is electrically equivalent to the provision of a store element of the kind shown in FIG. 1 at each hole. To increase the couplings between the circuits one or more turns of wire could be wound around each boss 16 but this is not normally necessary. The cores 6 can also be seen in FIG. 3. These are shown materially less in length than the thickness of the insulating plate so that when moved from one surface to the other they will have a significant effect in changing the coupling between the wires on one side in relation to the coupling between the wires on the other side of the insulating plate. They are conveniently about half as long as the bores in which they lie, or less.

Assuming that, as above suggested, the vertical columns of store elements serve for the storage of a single word each, then wires 13a, 13b, etc. will serve as interrogating circuits and all the digits of a word will be read out simultaneously on the parallel circuits represented by the group of wires 12a, 12b, etc. by an interrogating current pulse on the loop 13 of the column to be read. The length of the store in the horizontal sense as depicted can then be determined in accordance with the capacity requirement for the store and practical convenience. It is of course possible and may be preferable to provide a plurality of such stores, each of which is related to a block of information of a pre-determined size.

The physical size of a store of the kind described with reference to FIGS. 2 and 3 is of course a matter for choice, but the following dimensions will give an indication of a suitable physical form. Each core 6 may be of the order of 1 mm. or less in diameter and, say 1.5 to 3.0 mm. in length. The holes 11 will therefore need to be slightly larger than 1 mm. in diameter so as to enable the cores to slide freely through them, the thickness of the insulating plate will be of the order of 3 mm., and the thickness of the plate and bosses of the order of 6 mm. The spacing between the holes 11 will then be of the order of 2 mm. and a vertical column of 40 representing storage for a 40-digit word can then conveniently be provided in a vertical height of about 3½ ins. The horizontal length of the store will as above stated depend upon the number of vertical columns it is desired to provide, but for convenience and economy of setting up equipment it will probably be preferred to make this horizontal length rather large. A length of 16 feet and a width of 3½ ins. will provide sufficient area for the storage of 100,000 bits of information, a storage capacity adequate to cope with the instructions and constants storage requirements of a large computer. The setting up equipment presently to be described can then be traversed along the length of this long stirp of storage equipment to set up the store. It is of course not necessary that the 16-feet length should extend in a straight line; one convenient disposition of it would be in a spiral which would enable the set up device to be carried on an arm rotating about the centre of the spiral with the setting up head tracking along the convolutions of the store. It may, however, be preferred to provide a number of separate plates, each with their own setting up equipment so as to provide for greater speed of setting up.

Windings 12a, 13a, etc., on one side only of the frame can be equipped, so that the slug or core 6 moves between an idle position on the opposite side of the frame from the windings, and an active position on the same side of the frame as the windings, the differentiation being between presence and absence of an output signal as described in connection with the alternative arrangement of FIG. 1.

The setting up of a store of the kind which has just been described involves physical movement of the magnetic slugs between two positions adjacent each of the two faces of the insulating plate in which they are located. This movement can be brought about by mechanical probes arranged to enter the hole containing the slug either from one side or the other so as to push it into the required position. They may also be moved electromagnetically. A convenient and preferred method, however, is to use air jets by which the cores may be blown from one side to the other. It will be appreciated that alternatively, the cores may be sucked from one position to another by vacuum operation. FIG. 4 shows diagrammatically the preferred arrangement. The plate 10 containing the cores is flanked by a pair of pneumatic heads 20, 21 each carrying a plurality of jets distributed vertically so as to align with the holes 11 in the storage plate. The jets on opposite sides connect to opposite sides of a reversing valve 22a, 22b, 22c, etc. controlling the flow of compressed air to the individual jets. In order to set a core to the right hand end of its bore, as seen in the figure, compressed air will be admitted to the jet on the left hand pneumatic head 21, while to set it to the left hand end of its bore the corresponding valve 22 will be set to supply air to the right hand jet carried by head 21. Assuming that vertical columns of 40 storage devices are provided in the store, it is preferred to provide a single column of 40 pairs of jets controlled by 40 two-way valves which may of course be operated electromagnetically. This vertical column of air jets can be traversed along the storage plate and each vertical column of slugs set in turn. The slugs will of course have to be retained in their bores by some form of end stop and some examples will be described later. However, in order to minimize the effect of bouncing of the magnetic slugs away from the end stops, the control of the puffs of air issuing from the nozzles in the pneumatic head may be such as to provide a duration in excess of the time taken by the pneumatic setting head to pass the column. The slug will then come to rest against its end stop and be held there by the air pressure before the air blast has ceased. The air blasts may be controlled by electrical contacts or other means provided on the supporting plate and serving to switch them on just before each column of holes is reached so that the air flow is established before the jets come into line with the holes, while they are shut off just as the jets leave the column of holes. Clearly it is possible to provide a plurality of such setting heads or to provide more than a single column of jets so as to increase the speed at which setting up will take place.

Figure 14:
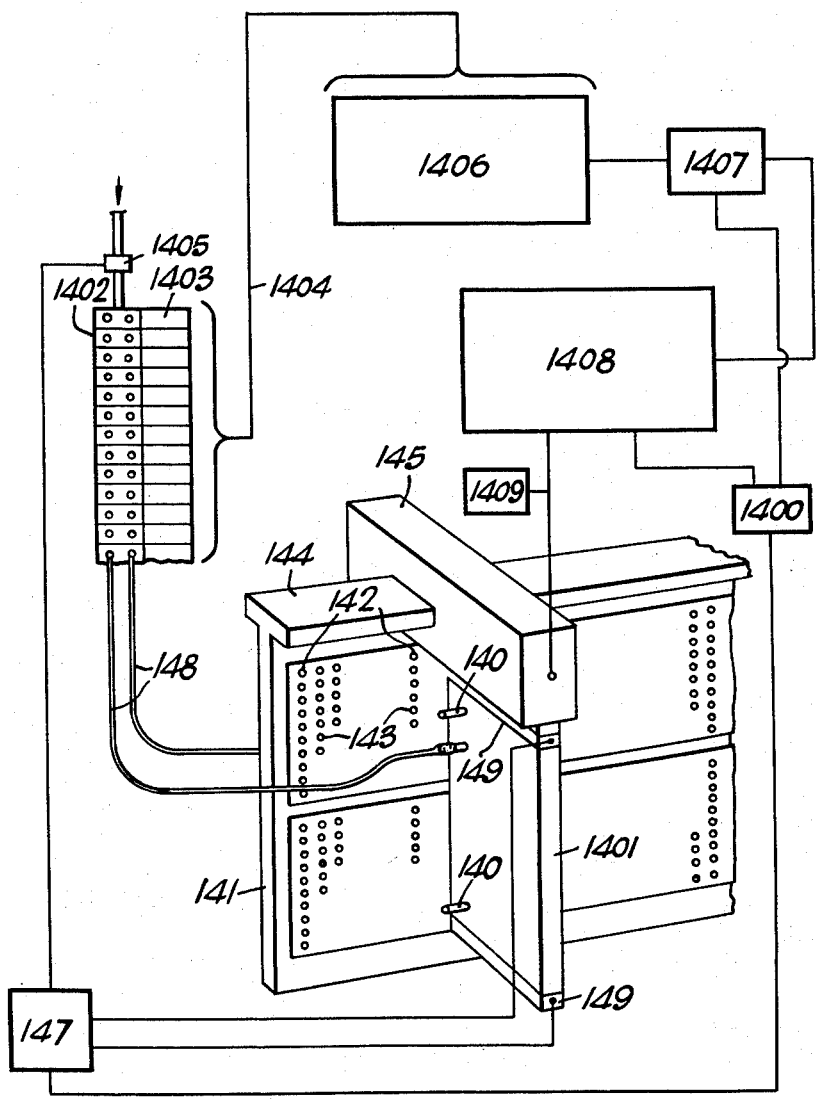

FIG. 14 shows schematically the equipment for setting up a store of this kind shown in FIG. 4. The control equipment is of course substantially the same as that used for inserting binary information into any coordinate store such as a ferrite store.

The suitably mounted frame 141 for the store carries a steel platform 144 on which is mounted a travelling carriage 145, the upper part 146 of which carries an interval motor-driven friction drive for moving the carriage continuously along the platform 144 at a suitable speed. The carriage carries two dependent columns 1401 on opposite sides of the frame 141.

The frame incorporates one or more coordinate arrays of storage elements of the type shown in FIG. 2 but having extreme top and bottom rows 142 of holes which are much smaller than those used for storage, and which cooperate with two sets of opposed complementary photoelectric equipments 149 on the two carriage columns 1401 so that the photo-electric equipment operates when the top and bottom holes of a store column 143 are in line therewith.

Between the two sets of photo-electric equipment 149 the carriage columns 1401 each carry compressed air channels 140 in vertical line and with the same spacing as the storage holes 143 in the frame. Each air channel 140 has a side inlet and an outlet from the face of the column opposed to the frame surface, the outlets being so spaced as to have a slight clearance from the ends of the bosses round the storage holes in the frame. The air channels 140 are each connected by flexible tubing to outlets on pneumatic valves 1402, each pair of opposed channels, one in each column 1401 being connected to the two outlets of a corresponding valve 1402.

Each valve 1402 is controlled by an electro-magnetic relay shown diagrammatically at 1403. The armature of each relay is arranged to operate a spring-loaded valve change-over plunger so as to close a normally-open outlet and open a normally-closed outlet. The valve plunger is spring-returned when the relay is de-energised. A main electrically-controlled air-control valve 1406 is controlled from the photo-electric equipment via a comparator 147 which determines that the two equipments 149 operate simultaneously and that therefore the carriage columns 1401 are truly vertical with the air channel outlets registering with a row of storage holes.

The relays 1403 are controlled from a pattern register 1406 by parallel connections 1404 and the register 1406 is operated from a tape reader or a store 1408 in well known manner. The transmission of successive "words" from 1408 to 1406 is controlled from the photo-electric equipment 149, 147 via a time delay 1400 and a gate 1407.

The first "word" may be sent from 1408 in response to the operation of a start switch 1409 which also starts the carriage drive. Alternatively, an initial pair of photo-electric control holes in the frame preceding the first storage column may operate equipment 149, 147, 1400; and 1408, 1407 in turn so that a word is sent from 1408 to 1406 which in turn sets the relays 1403 and valves 1402 in readiness for inserting the first "word" into the store. The valve 1405 would be operated without effect at this time.

When the carriage comes into line with the first column of holes, the photo-electric equipment 149, 147 will again operate to operate valve 1405 so that the slugs in the first column of holes are individually blown to the position determined by the position of the corresponding valve 1402. After a suitable delay determined in accordance with the time taken for the carriage to travel between rows of holes and sufficient to ensure that the valve 1405 is again closed and the pneumatic operation finished, the equipment 1408 will be signalled via 1400 to transmit the next "word" to register 1406, and gate 1407 is opened to permit the transfer. Register 1406 in turn operates the relays 1403 to a new setting which is also applied to the valves 1402 and the equipment is ready to insert the next "word."

In order that the effect of the magnetic slug on the circuits which it is to couple may be as great as possible, it is preferable that the slug should penetrate through the planes in which the conductors to be coupled are located. For this reason it is preferred to arrange for the core to pass slightly beyond the surface of the insulating material upon which the conductors (or in some circumstances, the outermost conductors are located. Various methods of achieving this result and of providing the physical structure required for the conductors are shown in FIGS. 5–9.

In FIG. 5 the plate 10 through which pass the bores 11 is shown as carrying on its opposite surfaces conductors 17, 17a. These conductors, which when suitably connected correspond to wire 13a, say, of FIG. 2, may be formed on the plate 10 by any suitable one of the so-called printed circuit techniques. To both faces of the plate 10 there are applied sheets of insulating material 25 and 26 which are provided with holes 11a of the same size as, and arranged to register with the bores 11 in plate 10. On the inner faces of sheets 25 and 26 there are provided, again by printed circuit techniques, conductors 18, 18a, 19 and 19a which will, when suitably connected, perform the function of wire 12a, say, of FIG. 2. Conductors 17, 17a and/or conductors 18, 18a, 19, 19a are coated with insulating varnish so as to prevent making contact between them when sheets 25 and 26 are placed in position. Finally, further sheets of insulating material 27 and 28 are applied to the outside surfaces of sheets 25 and 26. Sheets 27 and 28 are provided with holes 29, 30, arranged to register with the holes 11, 11a, but of slightly smaller diameter. These holes are also slightly smaller than the diameter of the slugs 6 so that access to the slugs 6 for the purpose of setting up the store can be obtained through the holes 29, 30, but the slugs cannot pass through these holes. The core 6 shown in its right hand position will be seen to penetrate right through the plane of the conductors 19, 19a as well as that of conductor 17a so as to provide effective coupling between them, and the same will of course apply to the core in relation to conductors 18, 18a and 17 when the core is on the other side.

In the arrangement shown in FIG. 6 the plate 10 again carries conductors 17, 17a and is flanked by sheets 25 and 26 carrying conductors 18, 18a, 19 and 19a as before, but with the conductors 18, 18a, 19 and 19a on the outside surface of the respective sheets. This avoids the necessity for insulating the two sets of conductors from one another by varnishing as above described, or otherwise. However, by providing for the slug 6 to penetrate the planes of conductors 18, 18a and 19, 19a, the coupling will still be adequate. In this example, the slugs 6 are retained in their bores by means of wires 31 and 32 carried on the outer surfaces of sheets 25 and 26, and bowed out away from their respective sheets where they cross the electric conductors and holes 11a so as to provide for this penetration of the slug 6 beyond the surface of the structure and also to avoid forming short-circuits between conductors 18 and 18a or 19 and 19a.

In an alternative construction the wires 31 and 32 are replaced by strips of plastic material suitably corrugated and stuck to the surface of the plate 10 at appropriate points. It is also possible to use sheets of insulating material dimpled to provide the extra clearance opposite the bores 11. In these latter cases apertures may be provided at the crests of the undulations to afford access to the slug 6 for the purpose of moving it by an air blast in setting up the store. Otherwise magnetic means could be used for setting up the store.

Figure 7:
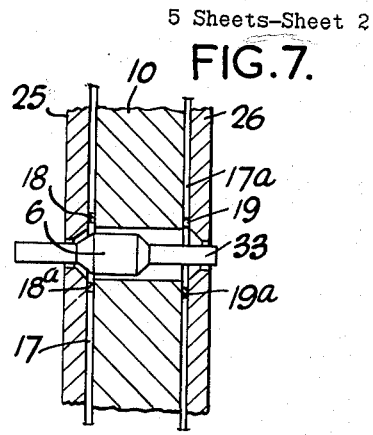
Figure 6:
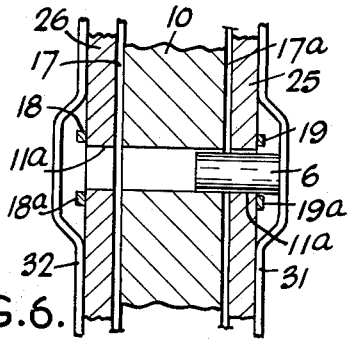

In the variant shown in FIG. 7, the slug 6 is shown mounted on a rod 33 which penetrates through the two sheets 25 and 26 which are provided as before. Holes in sheets 25 and 26 are, in this instance shown, counter-sunk and the ends of the slug 6 are shown chamfered so that the core can in effect penetrate beyond the plane containing the conductors 17 etc. The rod 33, by penetrating outside the structure provides a ready means for moving slug 6 by mechanical means. With such a structure the cores may all be set to one side of the structure by means of a plate or roller which operates over the whole surface of the structure on one side to push the slugs through to the far side. The protruding ends on the far side of the structure can then be operated on, by electromechanical means for example, to push selected slugs to the other side of the structure. It thus becomes possible to use an operating mechanism which is not required to penetrate into the structure. Greater speed of operation can thus be achieved.

Figure 8:
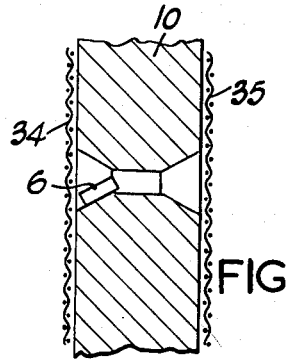

In the arrangement of FIG. 8 the conductors have been omitted for the sake of clarity of the drawing. They can be provided in any suitable manner. However, the arrangement in this figure illustrates an expedient which may be used to reduce the risk of slugs being moved from one position to the other accidentally, for example by vibration. In this construction, the outer ends of the bore 11 are flared so that the slug rests on the sloping part of the floor of the bore and is so prevented from moving too easily across to the other side. An alternative arrangement of this sort may be employed in which the floor of the bore is made with a central hummock and the slug replaced by a ball which can readily be moved over the hummock from one position into the other, but which would be restrained by gravity from moving across under the influence of vibration. The means shown in this example for retaining slug in the bore is a layer of fabric 34, 35 stretched over each surface of the plate 10. If the fabric coverings 44 and 45 are sufficiently open in texture quite adequate passage of air through them can be achieved for the purpose of moving the core from one side to the other. Alternatively, of course, some flexibility in the coverings 34 and 35 would allow the slug to protrude slightly so that it might be knocked mechanically from one side to the other.

Figure 9:
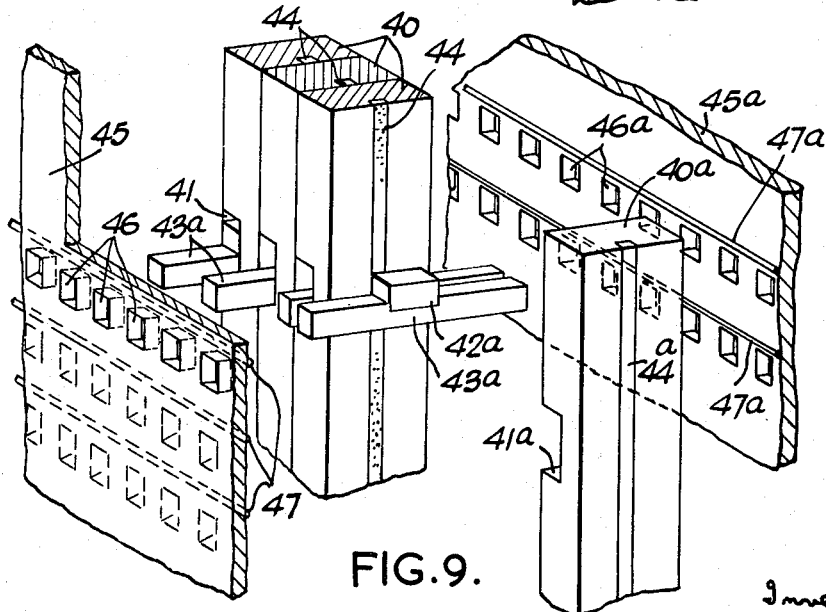

In the arrangement of FIG. 9 a somewhat different structure is illustrated. In this structure the plate 10 is replaced by a stack of bars 40, 40a. On one face of each bar is a series of notches 41, 41a, each adapted to receive a movable slug. The slug, one of which is shown at 42a, is in this case mounted on a cross-bar 43a by which it can be moved to and fro between opposite edges of the bar in which it is mounted. On the surface of the bar opposite to the notches is provided centrally a conductor 44, 44a which runs longitudinally of the bar the full depth of the structure. The slug 42a can rest on one side or the other of this conductor. The assembly of bars 40, 40a etc. is mounted between two flanking sheets of insulating material 45, 45a each of which is pierced with holes 46, 46a through opposed pairs of which the two ends of a cross-bar 43a can protrude. Along the upper side of holes 46, as also of the holes 46a, is a conductor 47, 47a. When this structure is assembled it will be seen that the slug 42a will lie either between the conductor 44 and the conductor 47a or between the conductor 44 and the conductor 47, thus effecting magnetic coupling between either one or the other of these two bars. Thus, if the conductors 47 and 47a are used as the interrogating circuit corresponding to wire 3 of FIG. 1, the signal in conductor 44 will be in the one sense or the other according to whether the slug 42a lies on the one side or the other of it so as to couple it effectively to either the forward or the return path of the interrogating circuit running through the conductors 47 and 47a.

The movement of slug 42a is of course brought about by mechanical operation on the cross bar 43a as in the example described with reference to FIG. 7.

The physical realization of the store according to the invention is of course capable of a wide variety of interpretations. For example, in place of an insulating plate such as the plate 10 or the bar structure of FIG. 9, a cellular or honeycomb structure may be employed, built up for example of corrugated strips suitably joined together in known manner or interleaved in the manner of a so-called egg-box construction.

The introduction of conductors into the structure is also capable of achievement in many different ways. Printed circuit techniques have already been referred to and have the advantage that a complex network can be laid down relatively cheaply and a large number of times so as to build up an extensive network for the purpose of a large store. On the other hand, it may be preferred to use wires or thin foil strips which may be bonded to the insulating material forming the supporting structure either directly or by forming the conductive strip on a thin insulating carrier and binding the carrier to the supporting structure.

Reference has been made to cylindrical slugs and in one example a rectangular shape of slug has been shown, while in another a ball has been referred to. In some circumstances it may be preferred to use a suitably-supported disc or ring. The choice of magnetic material is not critical, but it is preferred that the material used should not have high magnetic remanence since this might affect the symmetry of operation of the storage element.

Accordingly a preferred material is resin-bonded magnetic dust such as is used for high frequency tuning cores. The avoidance of hysteresis removes the speed limitation which occurs in stores employing cores of so-called square-loop magnetic material.

Although in the examples described the slugs are movable from one position to another in order to differentiate between two types of stored information, it is not necessary that one and the same slug be used for both types of stored information, that is to say the structure may be so made that a slug can be brought into position as required from some external supply. One arrangement of this kind involves the use of a paper or other suitable, preferably insulating, carrier to which is applied a pattern of magnetic dots or other elements so built up that when applied to one face of a structure the magnetic elements will lie in the proximity of the circuit crossing points between which coupling is required to be introduced. Such a sheet is then prepared, for example by printing with magnetic ink, in accordance with the information to be set up in the store and applied to the appropriate surface of the structure. If the store is to operate as in FIG. 1, then two such sheets should be prepared, one of which is the complement of the other, so that the sheets may be applied to the opposite faces of the circuit matrix and the two forms of information set up in the respective storage elements of the matrix by virtue of the magnetic elements which are brought into proximity with them either on the one side or the other by means of the two prepared sheets.

In the examples given above an electrical arrangement equivalent to that shown in FIG. 1 has been employed and a magnetic mass be brought into the proximity of one pair of coupled elements or the other. It will be understood, however, that the principle of bringing a magnetic mass into the proximity of a pair of coupled circuits to influence the coupling between them or not according to the type of information to be stored may be more widely interpreted. Thus, as stated in connection with FIG. 1 two circuits may be physically so arranged that the coupling between them is very small in the absence of the ferromagnetic material and is enhanced by the introduction of ferromagnetic material. The discrimination in the output circuit between two kinds of information ("0" or "1") would then be between no signal and signal instead of between signals of two different kinds. Again, in an arrangement similar to that of FIG. 1 the balance between the two opposed couplings in the system may be relied upon to cancel one another out and present no signal in the output circuit in the absence of a ferromagnetic mass to indicate one kind of information. A ferromagnetic element may then be brought into association with either one of the two coupling points to indicate another kind of information, by means of the presence of a signal in the output, regardless of its sense.

A difficulty encountered in the above arrangements is that the couplings between the two networks are not solely magnetic and it can happen that the capacitive coupling between the windings can be of sufficient magnitude to give rise to spurious signals.

Referring now to FIG. 10, 110 is a sheet of insulating material drilled with a matrix of holes 111 in each of which is fixed a short tube 111a which protrudes a short distance on either side of the sheet 110. This construction provides an appropriate length of bore to receive a magnetic slug (not shown in the drawing) without requiring the provision of a thick slab of insulating material. It also has the advantage that the projecting ends of the tubes 111a provide bosses around which the circuit wires may be wound. As in the arrangements described above, two sets of windings 112a, 112b,, etc. and 113a, 113b etc. extending in orthogonal directions, are provided. In addition in this case third windings 112a', 112b' etc. are provided linking up the horizontal rows of storage cells. The windings 113a, 113b etc. which extend vertically are interrogating windings and serve to interrogate a complete column of storage cells so that all the digits of a word may be read out simultaneously on the horizontal read wires 112a, 112b etc., 112a', 112b', etc. It will be seen that the wires are wound in undulating paths so as to pass between successive cells and this partial wrapping of the wire around each cell position increase the basic coupling achieved between the circuits.

The windings 112a', 112b' etc., are wound in the reverse sense to windings 112a, 112b etc. so that if, for example, the winding 112a provides a positive-going signal, the winding 112a' will provide in this circumstance a negative-going signal and vice versa.

While the magnetic couplings between the interrogating and read windings are conscious of the direction of current flow in the interrogating winding, the capacitive couplings are conscious only of voltage variations between the windings and will be in the same sense. Thus, the signals may be of the form shown in curves a, b of FIG. 11. In a curve a the signal obtained in a read winding, say 112a, due to magnetic coupling for the indication of a "1" say, is shown at L. The signal due to capacitive coupling of the same windings 112a with 113a is shown at C. The actual output signal will of course be a composite of these two waveforms, the waveform C being superimposed on waveform L. The corresponding waveforms for a nought are shown at curve b of FIG. 11. In FIG 10 however, two oppositely-wound read windings are provided for each digit, and the outputs for these two windings when "1" is read are shown in curves c and d of FIG. 11. There is, in fact, no difference between the waveforms shown in c and d from those shown in a and b, but it must be emphasized that they correspond to the two signals obtained in the two read windings 112a and 112a' for a recorded "1". The corresponding signals for a "0" are given at e and f. It will now be seen that by combining the signals from the two read windings in FIG. 10 so that the two magnetic components will add together, the two capacitive components of the output signals will cancel one another out. The resultant output signal, therefore, is a pure signal, due to magnetic coupling of twice the amplitude obtained with a single winding.

Figure 10A:
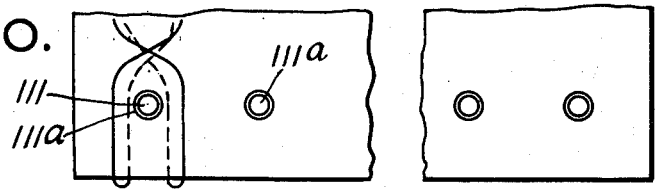

FIG. 10a illustrates the way in which the required output is obtained, and shows only the three windings at one side of the frame 110 surrounding that end of a single tube 111a. The interrogating winding is in effect a single continuous turn IT around the tube 111a. The two read windings are shown as complementary halves of a single turn, earthed at a centre point and terminating in a centre-tapped induction coil IC. As stated, the voltages induced in the two read windings are in opposition, while the capacitive voltages are additive. However, these voltages are applied to the oppositely-wound primary coils of IC so that the induction voltages are added in the secondary of IC, while the capacitive voltages cancel one another.

The result is a pure signal. The windings 112a, 112a', 113 of FIG. 10 are wound so as to give the result explained above.

FIG. 12 illustrates a form of structure which comprises a sandwich construction consisting of sheets 110a, 110b, 110c, 110d and 110e. The patterns on the faces of the sheets are suitable for reproduction by a printing process, and serve to provide a relatively close coupling of each printed conductor with each hole of the matrix. One pattern printed on the outside face of sheet 110a provides one set of read windings, say 112a, 112b etc. A similar pattern printed in the vertical direction provided on one side of sheet 110b provides the interrogating windings while a pattern similar to that shown on sheet 110a is printed on the back surface of sheet 110b to provide read windings 112a', 112b' etc. These are all the windings on one side of the structure. Central sheet 110c which carries no windings provides thickness so that the two sets of windings on opposite sides of the structure are suitably separated. Sheets 110d and 110e which correspond to 110b and 110a respectively, complete the sandwich.

The device shown in FIG. 4 is a convenient embodiment for a magnetic slug carrier for the manipulation of a magnetic slug in equipment of the kind shown in FIGS. 1 and 2. It will be seen to comprise a rod-shaped body 50 having an enlarged head 51, the end face of which is slightly dished. The magnetic slug itself is shown at 52, forming a part of the rod-like body of the device. The position of the slug on the body is such that when the head 51 is pressed into contact with one face of the store structure, let us say the front face, the slug is in position to couple the circuits on the far side of the structure, while when the small end of the rod is brought flush with the rear face of the sheet, the slug is brought into coupling relation with respect to the circuits on the front face. Slugs of such a type contained in a store matrix of the kind described can thus be set into a datum position by means of a pressure plate, for example, operating on the small ends of the rods. Any individual carrier, however, may readily be pushed to the other side to indicate a different kind of information by pressure on the enlarged head. The dished form of the exposed surface of this head enables a jet of air to be used to blow the device through the structure. The air stream is deflected by the concavity away from neighbouring slugs so that they can be grouped close together and each operated individually without high precision in the positioning of the air jet by which the setting is to be effected.

Carrier device 50-52 lends itself to cheap mass production since it may be moulded from plastic material, the slug 52 being added in the form of a magnetic dust composition moulded in a groove formed in the plastic body or introduced into a cavity formed axially in the body and closed by a plug of non-magnetic material.

Although it has been assumed that magnetic material will be used for the slugs in a storage apparatus of the kind described, it is of course not essential that magnetic material be used since the coupling between the coils of the system can be influenced by non-magnetic conductors, e.g., copper, brass or aluminium, but in the reverse sense from that obtained with magnetic material. Although such non-magnetic slugs are unlikely to provide as high a discrimination as can be obtained with magnetic slugs, nevertheless satisfactory results can be obtained, for example with a small length of tubing of one of the metals mentioned. In the construction described with reference to FIG. 4, therefore, it may be convenient to provide the slug proper in the form of a metallic band plated or sprayed on to the surface of the rod-like body.

Finally, although it has been assumed that each slug may occupy one of two alternative positions, it is possible to extend the system to provide more than two possible stations for the slug so that the whole equipment may take the form of a three-dimensional assembly, mechanical means being provided by which the slugs may be set to their required stations in accordance with the information to be stored so that an interrogating signal will give rise to an output on one only of a number of circuits with which it is associated. Such an arrangement may be of use in decimal systems, the position of the slugs serving to "mark" the value of a digit.

One expedient which may be used for positioning the slugs is the use of slug carriers of the kind shown in FIG. 4 with the slugs positioned at different locations along the rod portion corresponding to the various statics into which they are required to be set. Appropriate carriers for the information to be set up may then be selected and inserted into the respective storage locations.

The unwanted capacitive coupling discussed above is due to the close proximity of the two sets of windings and the resultant spurious signals can be equal to about half of the desired signal due to magnetic coupling.

Another method of avoiding the capacitive coupling is to locate the various windings at a distance apart. This can be applied both to single pairs of windings with or without a slug, or to the differential arrangement of FIG. 1.

Horizontal and vertical sets of windings can be located at a distance apart, conveniently on the opposite faces of a frame and a magnetic slug is either disposed so as to form an inductive coupling between the two sets of windings or completely removed from such position. Clearly removal of a slug need only be by so much that it causes no effective coupling at that position, or for that matter any other position in the store matrix. Thus, the slugs may be selectively removed as desired either manually or by mechanical means to a suitable distance in any of the ways described above, or may be removed altogether.

The capacitative coupling between the two sets of windings is reduced to a negligible value due to their separation from one another. As a result of this the discrimination ratio as between output signals derived from any co-ordinate position when a slug is present at that position and when there is no slug may be increased to a ratio of the order of 9:1.

The form of store with a single set of horizontal conductors and a single set of vertical conductors, in which the discrimination is between "output" and "no output," lends itself to very economical forms of construction.

Figure 15:
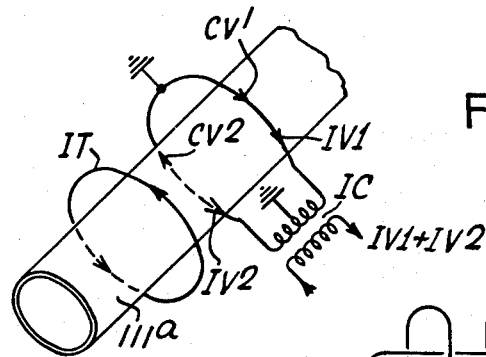
FIG. 15 is a diagram of a mesh store using a single coordinate array of windings.

A preferred form is a woven mesh 150, FIG. 15, of insulated wires 151, 152 in the interstices of which slugs 154 can be inserted. By applying a semi-solid plastic material 153 such as plasticine over the mesh, any slugs which are inserted in the mesh will be held in position thereby.

The wires will be used in pairs each pair being connected up in a loop. In this way it is possible to utilise each alternate mesh aperture both horizontally and vertically for storage purposes, the remaining mesh holes being unused.

Such a mesh with slugs inserted where necessary to create a required library of information can be mounted between complementary cellular frame members to protect the store from interference. Electrical connection can easily be made to the ends of the individual wires of the mesh, which will be connected up to access equipment of the well-known type for reading coordinate stores so that immediate access can be obtained to any column of storage device as required for reading purposes.

An interrogating pulse will be applied to a vertical loop and according as there is, or is not, a slug in any storage hole in the column, a high voltage pulse or a very low voltage pulse will be generated in the corresponding horizontal loop. The pattern of high voltage pulses on the horizontal loops defines the "word" read from the column store.

I claim:

1. An information store comprising a first plurality of sets of spaced GO and RETURN conductors each forming an elongated inductive loop extending in one direction, a second plurality of sets of spaced GO and RETURN conductors each forming an elongated inductive loop extending in a transverse direction to define a mesh of apertures at the intersections with the loops of said first plurality, the intersecting loops defining the coupling between respective apertures, a magnetic coupling member in at least one arbitrarily-selected one of said apertures coupling together the loop of said first plurality with the loop of said second plurality defining said arbitrarily-selected aperture, a rectangular frame incorporating a co-ordinate array of holes through the frame to correspond with the aperture of said mesh and to receive said modifying members, the conductors being supported on one face of said frame, and extensions to said first and second plurality of loops being extended to form a complementary mesh of apertures on the other face of said frame, one plurality of said loop extensions being differentially disposed with respect to the parts of those loops on the first mentioned face of said frame.

2. A store according to claim 1 comprising a magnetic member in each hole of said frame, the axial dimension of each member being small in relation to the axial length of its respective frame hole.

3. A store according to claim 1 wherein each conductor is arranged to pass on opposite sides of successive ones of its respective frame holes.

4. A store according to claim 1 comprising means to position modifying members in selected holes of said frame at their ends associated with the first-mentioned mesh of apertures and to position modifying members in the remainder of said holes at their ends associated with the complementary mesh of apertures.

5. A store according to claim 4 wherein the positioning means is pneumatic.

6. A store according to claim 4 comprising a travelling carriage mounted on said frame to carry said positioning means and wherein said positioning means comprises means for simultaneously selectively positioning a member in each hole of a line of holes associated with one conductor loop.

7. A store according to claim 6 wherein said frame comprises a plurality of registering holes, one associated with each line of holes for operation upon by said positioning means, and comprising photo-electric means on said travelling carriage for cooperating with said registering holes to align said positioning means with lines of holes to be operated upon thereby.

8. A store according to claim 7 comprising control means to be set in accordance with a plurality of information elements to be stored, said control means predetermining the operation of said positioning means on the members in a line of holes forming the storage location of said information elements.

9. An information store comprising a plurality of first conductors each forming two differentially-wound inductive long loops and a plurality of second conductors each forming two differentially-wound inductive long loops so arranged that the two pluralities of like first loops are respectively associated with the corresponding pluralities of like second loops, wherein each first loop intersects all like second loops and each second loop intersects all like first loops, and reluctance-modifying magnetic members each allocated to a respective pair of differential loop intersections formed by the same pair of first and second conductors and capable of movement between positions in which it effectively modifies the reluctance of the individual lop intersections of the pair.

10. An information store comprising two arrays of means for receiving and supporting reluctance-varying members, said arrays having equal numbers of said means and being arranged so that the individual means of the two arrays are associated in pairs, one from each array, and said arrays being arranged so as to be capable of division into a first set of groups of such pairs of means, and also into a second set of groups of such pairs of means, a plurality of first conductors respectively forming two differentially-wound inductive loops around corresponding first groups of such pairs of said receiving and supporting means, a plurality of second conductors respectively forming two differentially-wound inductive loops around corresponding second groups of said receiving and supporting means, wherein each loop surrounds a group of receiving and supporting means all belonging to the same array, and a single reluctance-varying member for each such pair of receiving and supporting means and capable of movement between the receiving and supporting means of the pair to which it is allocated.

11. An information store comprising two arrays of conductors arranged so that each conductor of each set crosses each conductor of the other set, a support for a loose magnetic slug at each intersection between a conductor of one set and a conductor of the other set arranged to provide a plurality of defined supporting positions for a slug in at least one of which a slug in said position modifies the inductive coupling between a pair of crossing conductors, a magnetic slug loosely carried in each said supporting, and power-operated means for selectively moving an arbitrary selection of said lugs from one of said defined positions to another of said defined positions.

12. An information store comprising a plurality of first conductors each forming two differentially-wound inductive long loops and a plurality of second conductors each forming two differentially-wound inductive long loops so arranged that the two pluralities of like first loops are respectively associated with the corresponding pluralities of like second loops, wherein each first loop intersects all like second loops and each second loop intersects all like first loops, and two non-magnetic sheets arranged respectively adjacent said two like arrays of loop intersections, and at least one magnetic member carried on each said sheet at an arbitrarily-selected intersection position.

13. An information store comprising a first plurality of sets of spaced GO and RETURN conductors each forming an elongated inductive loop extending in one direction, a second plurality of sets of spaced GO and RETURN conductors each forming an elongated conductive loop extending in a transverse direction to define a mesh of apertures at the intersections with the loops of said first plurality, the intersecting loops defining the coupling between respective apertures, and a magnetic coupling member in at least one arbitrarily-selected one of said apertures coupling together the loop of said first plurality with the loop of said second plurality defining said arbitrarily-selected aperture, a plurality of interrogating means each associated with a different one of said first plurality of loops for applying interrogating current pulses to any selected one of said first plurality of loops, and read out means each associated with a different one of said second plurality of loops for indicating current pulses induced in any selected one of said second plurality of loops due to the presence of a magnetic coupling member in an aperture defined by a selected loop of said first plurality and a selected loop of said second plurality.

14. An information storage device comprising first and second sets of pairs of adjacent spaced electrical conductors, means for mounting said first and second sets of conductors respectively in first and second adjacent spaced parallel planes, one conductor of each pair being electrically connected in series with the other conductor in such manner that current flowing in one direction in one conductor of a pair flows in the opposite direction in the other conductor of the pair, said sets of conductors being so disposed that each pair of conductors of said first set crosses over each pair of conductors of said second set, whereby a plurality of storage locations are formed each of which locations is uniquely defined by the cross-over of a particular pair of conductors of said first set and a particular pair of conductors of said second set and means for storing information in the device at any required storage location consisting of a piece of ferromagnetic material selectively placeable so as to link inductively the two pairs of conductors which cross over at the required storage location.

15. An information storage device as claimed in claim 14 in which said first and second sets of conductors are sets of parallel pairs of conductors.

16. An information storage device as claimed in claim 15 in which the conductors of said first set extend in a direction substantially perpendicular to the conductors of said second set.

17. An information storage device as claimed in claim 14 including a sheet of electrically non-conductive material having two major surfaces constituting said first and second adjacent spaced parallel planes.

18. An information storage device as claimed in claim 17 in which said sets of conductors are printed on said surfaces.

19. An information storage device as claimed in claim 14 including a plurality of pieces of ferromagnetic material in the form of pegs, and wherein each storage location comprises a hole into which one of said pegs may be inserted.

References Cited by the Examiner
UNITED STATES PATENTS

| | | | |
|---|---|---|---|
| 2,082,121 | 6/37 | Rypinski et al. | 323—45 X |
| 2,187,115 | 1/40 | Ellwood et al. | 340—174 X |
| 2,230,945 | 2/41 | Hansell | 323—45 X |
| 2,430,757 | 11/47 | Conrad et al. | 323—45 X |
| 2,598,252 | 4/52 | Gossick | 323—45 |
| 2,741,757 | 4/56 | Devol | 340—174 |
| 2,814,031 | 11/57 | Davis | 340—174 |
| 2,846,673 | 8/58 | Gray | 340—174 |
| 2,948,885 | 8/60 | Stuart-Williams | 340—174 |
| 2,964,740 | 12/60 | Hense | 340—174 |
| 2,981,935 | 4/61 | Nasoni | 340—174 |
| 3,027,548 | 3/62 | Vaughan | 340—174 |
| 3,061,821 | 10/62 | Gribble et al. | 340—174 |

IRVING L. SRAGOW, *Primary Examiner.*

EVERETT R. REYNOLDS, WALTER W. BURNS, Jr., *Examiners.*